Jan. 7, 1930.  T. H. THOMAS  1,742,428
ELECTROPNEUMATIC BRAKE
Filed June 8, 1928
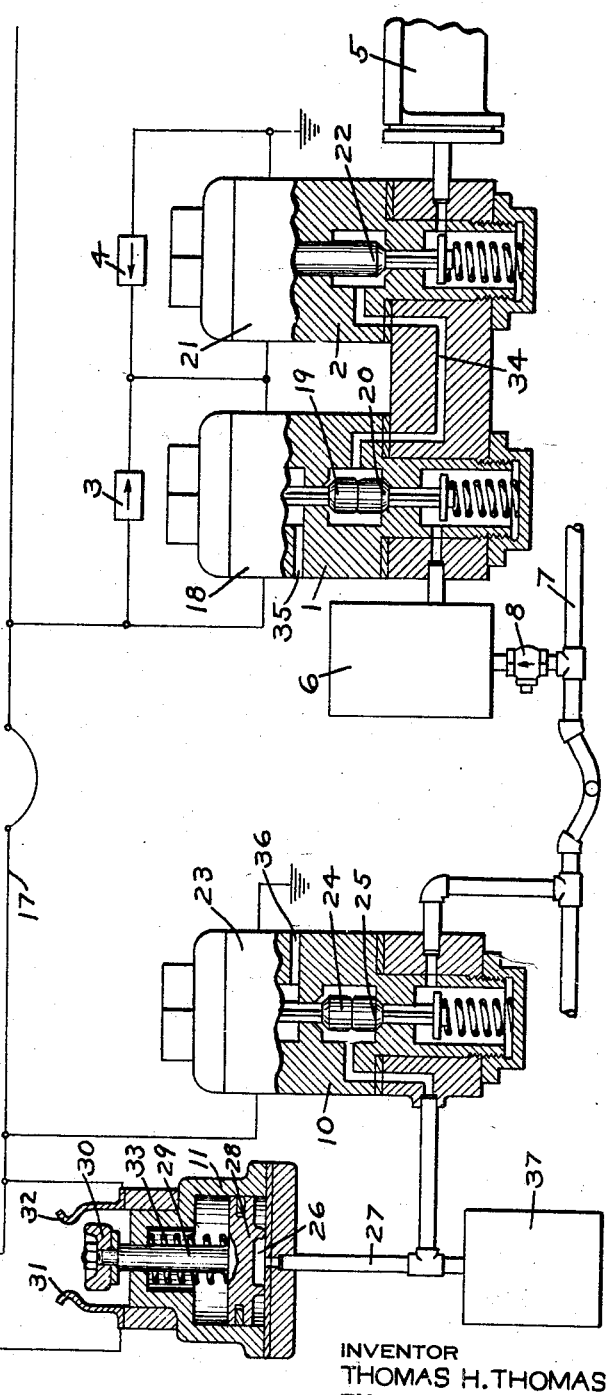
INVENTOR
THOMAS H. THOMAS
BY
*Wm. M. Cady*
ATTORNEY Patented Jan. 7, 1930

1,742,428

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed June 8, 1928. Serial No. 283,789.

This invention relates to electro-pneumatic brakes, and more particularly to an electro-pneumatic brake equipment in which the application and release of the brakes is controlled through a single train wire.

The principal object of my invention is to provide an electro-pneumatic brake equipment of the above character, in which the brakes are applied in a service application of the brakes at a slower rate than in an emergency application of the brakes.

In the accompanying drawing, the single figure is a diagrammatic view, partly in section, of an electro-pneumatic brake equipment embodying my invention.

The electro-pneumatic brake equipment shown in the drawing is similar in many respects to that disclosed in my prior Patent No. 1,653,130, issued December 20, 1927, and in which each car is equipped with a release magnet valve device 1, an application magnet valve device 2, rectifiers 3 and 4, or other devices adapted to permit the flow of current only in one direction, a brake cylinder 5, and a reservoir 6, adapted to be charged with fluid under pressure from a fluid pressure supply pipe 7, through a check valve 8.

On the locomotive is provided a source of electric current 9, a brake switch device, and according to my present invention, a magnet valve device 10, and a fluid pressure controlled switch device 11.

The switch device is provided with contact fingers 12, 13, 14, 15, and 16, the contact finger 12 being connected to the negative lead of the source of current 9, the finger 13 to the positive terminal of the source, the finger 14 to ground, the contact finger 15 to a train wire 17, and contact finger 16 to one terminal of the switch device 11.

The release magnet valve device 1 comprises an electro-magnet 18 and double beat valves 19 and 20 adapted to be operated by said magnet. The application magnet valve device 2 comprises an electro-magnet 21 and a valve 22 adapted to be controlled by said magnet.

The magnet valve device 10 comprises an electro-magnet 23 and double beat valves 24 and 25, adapted to be controlled by the magnet 23. The switch device 11 comprises a casing having a piston chamber 26 connected to a pipe 27 and containing a piston 28. Said piston is provided with a stem 29 carrying a contact member 30, adapted when the piston is moved outwardly to bridge contacts 31 and 32, the piston 28 being urged downwardly by a spring 33.

In the running and release position of the brake switch, the contact fingers engage contacts so connected that current flows through the train wire 17 in the direction indicated by the arrow shown on the rectifier 4. The magnet 21 is not energized, since the major portion of the current flows through the shunt circuit around the magnet containing the rectifier 4, which permits flow of current in that direction.

The magnet 18 is energized by current flowing in this direction, since the rectifier 3 prevents flow in this direction through the shunt circuit around magnet 18 containing the rectifier 3. With magnet 21 deenergized, the valve 22 is held unseated, opening communication from the brake cylinder 5 to passage 34 and with magnet 18 energized, the valve 20 is held seated while the valve 19 is unseated, so that passage 34 is connected to atmospheric exhaust port 35.

Magnet 23 is energized by the current flowing through wire 17, so that valve 25 is held seated, while valve 24 is unseated, and consequently pipe 27 is connected to atmospheric exhaust port 36. The pipe 27 and also the volume reservoir 37 being at atmospheric pressure, the piston 28 is held by spring 33 in its lower position, so that the contact 30 does not bridge the contacts 31 and 32.

When it is desired to effect a service application of the brakes, the brake switch is turned to service position, in which contact finger 16 engages a contact 38 and contact finger 13 engages contact 39 which is electrically connected to contact 38. Contact finger 14 also engages contact 40, while contact finger 12 engages contact 41, which is electrically connected to contact 40.

The contact finger 15 does not engage a contact in the brake switch, in this position, so that current is not supplied to the train wire 17 through the brake switch. The magnets 18, 21, and 23 are therefore deenergized and the magnet 18 being deenergized, the valve 19 is seated, while the valve 20 is unseated, so that fluid under pressure from reservoir 6 is supplied to passage 34. The magnet 21 being deenergized, the valve 22 is unseated, and consequently fluid under pressure supplied to passage 34, flows to the brake cylinder 5 to effect an application of the brakes.

The deenergization of magnet 23, causes the valve 24 to seat and the valve 25 to be unseated. With valve 25 unseated, fluid under pressures from the fluid pressure supply pipe 7 flows to pipe 27 and the reservoir 37. When the pressure in the reservoir 37 has been increased to a predetermined degree, sufficient to overcome the pressure of spring 33, the piston 28 will be moved upwardly so as to cause the contact member 30 to bridge the contacts 31 and 32.

Current is then supplied to the train wire 17 from the positive terminal of the source of current 9, through contact finger 13, contact 39, contact 38, contact finger 16, through the switch contacts 31 and 32 to train wire 17 to ground at the magnets 23, 18, and 21, and through the ground circuit to contact finger 14, contact 40, contact 41, and finger 12 to the negative terminal of the source of current.

The flow of current is now in the direction of the arrow on the rectifier 3, so that the magnet 18 is deenergized, while the magnet 21 is energized.

With magnet 21 energized, the valve 22 is seated, so that communication from the passage 34 to the brake cylinder 5 is cut off and the flow of fluid to the brake cylinder ceases.

The energization of magnet 23 causes the valve 25 to be seated and the valve 24 to be unseated, so that fluid is vented from the reservoir 37 through the port 36 and when the pressure in said reservoir and on the piston 28 has been reduced to a predetermined degree, the piston will be shifted downwardly by spring 33, so as to cause the contact member 30 to open the circuit through which the train wire 17 is energized.

No current flowing through the train wire, the magnets 18 and 21 are deenergized and, as before described, fluid under pressure is again supplied from the reservoir 6 to the brake cylinder 5. The magnet 23 being also deenergized, the valve 25 is opened to again supply fluid under pressure to the reservoir 37.

It will thus be seen that in effecting a service application of the brakes, the magnet 21 is alternately energized and deenergized, according as the reservoir 37 is charged with fluid under pressure, and fluid under pressure is vented from the reservoir and consequently, the brake cylinder being supplied with fluid under pressure only intermittently, a more gradual increase in brake cylinder pressure is provided.

In emergency position, all circuits are open, so that no current is supplied to the train wire 17 so long as the brake switch remains in emergency position. Consequently, the magnets 18 and 21 are held deenergized and fluid under pressure is continuously supplied from the reservoir 6 to the brake cylinder 5 until the pressures equalize.

It will thus be seen that with the above described equipment, a slower rate of brake application is effected in a service application of the brakes than in an emergency application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an electro-pneumatic brake, the combination with a brake cylinder and electrically controlled means operated upon deenergization to effect the supply of fluid under pressure to the brake cylinder and upon energization to cut communication through which fluid is supplied to the brake cylinder, of means operating automatically to alternately energize and deenergize said electrically controlled means.

2. In an electro-pneumatic brake, the combination with electrically controlled means for controlling the supply of fluid under pressure to effect an application of the brakes, of a train wire connected to said electrically controlled means, a switch device for opening and closing a circuit through which current is supplied to said train wire, and means operating automatically for causing said switch device to alternately open and close said circuit.

3. In an electro-pneumatic brake, the combination with electrically controlled means for controlling the supply of fluid under pressure to effect an application of the brakes, of a train wire connected to said electrically controlled means, a switch device operated by variations in fluid pressure for opening and closing a circuit through which current is supplied to said train wire, and electrically controlled means for varying the fluid pressure on said switch device.

4. In an electro-pneumatic brake, the combination with electrically controlled means for controlling the supply of fluid under pressure to effect an application of the brakes, of a train wire connected to said electrically controlled means, a switch device operated by variations in fluid pressure for opening and closing a circuit through which current is supplied to said train wire, and electrically controlled means connected to said train wire for controlling the variations in fluid pressure on said switch device.

5. In an electro-pneumatic brake, the combination with electrically controlled means for controlling the supply of fluid under pressure to effect an application of the brakes, of a train wire connected to said electrically controlled means, a switch device operated upon an increase in fluid under pressure for closing a circuit through which current is supplied to said train wire and upon a decrease in fluid pressure for opening said circuit, and electrically controlled means operated upon energization of said train wire for supplying fluid under pressure to said switch device and upon deenergization of said train wire for venting fluid from said switch device.

6. In an electro-pneumatic brake, the combination with a brake cylinder, a valve for controlling the supply of fluid under pressure to the brake cylinder, and electrically controlled means for opening said valve upon deenergization and for closing said valve upon energization, of means operating automatically to effect the alternate energization and deenergization of said electrically controlled means.

7. In an electro-pneumatic brake, the combination with a brake cylinder, a valve for controlling the supply of fluid under pressure to the brake cylinder, and electrically controlled means for opening said valve upon deenergization and for closing said valve upon energization, of means operating automatically to effect the periodic energization and deenergization of said electrically controlled means.

In testimony whereof I have hereunto set my hand, this 5th day of June, 1928.

THOMAS H. THOMAS.